Patented Apr. 14, 1936

2,037,037

UNITED STATES PATENT OFFICE 2,037,037

METHOD OF TREATING COFFEE

David Pelton Moore, Avon Park, Fla., assignor to Max A. Schlesinger, New York, N. Y.

No Drawing. Application March 6, 1933, Serial No. 659,838

3 Claims. (Cl. 99—11)

This invention relates to improvements in method of treating coffee. One object of the invention is the provision of a process which renders coffee harmless to the digestive tract.

Another object of the invention is the provision of a process which is readily usable with the coffee bean whether in the green or raw, or roasted state, but which so acts upon same as to retain its original aroma, that is tannic acid, viridine, caffeotannic acid and other elements that impart the taste and aroma to the coffee, the caffein-salts not being removed but being stabilized so that the completed coffee has all of its pleasant taste and none of its disagreeable after effects.

It has been discovered that what makes coffee deteriorate, and in order of the importance thereof, are:—volatilization of the aroma, oxidation of the aroma, and oxidation of the coffee oils, resulting in rancidity. The loss of the aroma has been traced to its absorption by the gases still contained in the ground coffee after the bean has been broken up.

The main process consists primarily of crushing the green or roasted beans, placing them thereafter in a drum which can be sealed airtight, withdrawing the air through vacuum means, and then forcing into the drum and through the contents carbon dioxide gas, either heated or cold, preferably the latter. This pressure is brought up to from 150 to 200 lbs., and maintained at this point for about 30 minutes to one hour. If the mass is in the green or raw state, the same is now removed and roasted, and then ground to desired size; or if previously roasted, it is merely ground to desired size. The resultant ground or pulverized coffee is now vacuum packed, or it may be packed in atmospheric pressure cartons, for this process renders the coffee anti-rancid, or stabilizes the essential oils so that they do not quickly become rancid, as is the case with coffee merely roasted and packed, or left in the open air.

Where so desired the drum containing the coffee may be heated to from 50 to 100 degrees cent., during the introduction and retention of the dry carbon dioxide gas, and also to insure that each particle be affected, the mass can be agitated with a mixing spiral or paddles in dasher formation during this period.

Thus it will be evident that by comminuting the coffee bean, even in its green state, but preferably after roasting, removing the air therefrom, subjecting the same to carbon dioxide gas under pressure, and packaging the same in hermetically sealed containers, that the coffee will be prevented from becoming rancid and will keep in this desired condition indefinitely and will be ready to be brewed in the usual way for drinking purposes, the action of comminuting and removing the air in the bean and treating with carbon dioxide gas being the essential steps, while that of hermetically sealing the packages containing the thus treated coffee insures the retention of the coffee in this state for ready use.

It is a fact that coffee treated in the manner set forth herein will produce a beverage that is just as aromatic as normal coffee beverage, but that coffee so treated will not sour in the stomach, will not keep the drinker awake at nights, that instead of retarding it stimulates digestion and to an appreciable extent regulates the bowels, thus producing a beneficial beverage and one that can be drunk at any time of the day and night.

What is claimed is:—

1. A process which consists in crushing roasted coffee and removing a greater portion of the contained air therefrom by vacuum action, subjecting the same to the action of carbon dioxide gas at a sufficient pressure and time period to compensate for the drawn off air and thereby stabilize the constituents of the coffee, and then packaging the same hermetically.

2. A process as claimed in claim 1, in which the contained gases are removed by vacuum action and the supplied carbon dioxide gas is at a pressure of from 150 to 200 lbs. pressure and the time period is from 30 minutes to one hour.

3. A method of treating coffee, which consists in extracting a greater portion of the air from crushed roasted coffee, subjecting the coffee then to the action of carbon dioxide gas at a sufficient pressure and time period to compensate for the extracted air and to thereby stabilize the constituents of the coffee, and then packaging the coffee hermetically.

DAVID PELTON MOORE.